United States Patent [19]

Sturges

[11] Patent Number: 4,535,879
[45] Date of Patent: Aug. 20, 1985

[54] CONTROL SYSTEM FOR CONTROLLING THE ENGAGEMENT OF A PRESSURE-OPERATED ACTUATOR

[75] Inventor: Fred D. Sturges, Rockford, Ill.

[73] Assignee: Borg-Warner Corporation, Chicago, Ill.

[21] Appl. No.: 584,565

[22] Filed: Feb. 29, 1984

[51] Int. Cl.³ .............................................. F16D 11/06
[52] U.S. Cl. ...................................... 192/52; 192/0.03; 361/152
[58] Field of Search ................... 192/52, 85 R, 109 F, 192/103 F, 3.58, 0.076, 0.075, 0.03; 361/152

[56] References Cited

U.S. PATENT DOCUMENTS

| | | | |
|---|---|---|---|
| 2,681,116 | 6/1954 | Treseder | 170/160.2 |
| 2,797,666 | 7/1957 | Chubbuck | 121/41 |
| 3,437,188 | 4/1969 | Long | 192/103 |
| 3,454,101 | 7/1969 | Breitbarth et al. | 172/4.5 |
| 3,768,373 | 10/1973 | Divigard | 91/417 |
| 3,834,499 | 9/1974 | Candellero et al. | 192/0.09 |
| 3,840,045 | 10/1974 | Grosseau | 137/495 |
| 4,072,220 | 2/1978 | Hamada | 192/0.075 |
| 4,116,321 | 9/1978 | Miller | 192/103 |
| 4,432,445 | 2/1984 | Windsor | 192/103 F X |
| 4,485,424 | 11/1984 | Niwa et al. | 361/152 |
| 4,487,303 | 12/1984 | Boueri et al. | 192/0.052 |
| 4,490,771 | 12/1984 | Huber et al. | 361/152 X |
| 4,492,913 | 1/1985 | Arnold et al. | 361/152 |

Primary Examiner—Edward G. Favors
Attorney, Agent, or Firm—James E. Tracy

[57] ABSTRACT

A smooth, optimum engagement of a pressure-operated actuator, such as a brake or clutch, is obtained by producing a pulse width modulated signal, having a gradually changing duty cycle, which is then used to control a three-way on/off solenoid valve to which is supplied pressurized fluid such as air. The solenoid valve is rapidly switched between pressure in and exhaust out in accordance with the changing duty cycle in order to develop a gradually increasing fluid pressure for application to the actuator.

12 Claims, 1 Drawing Figure

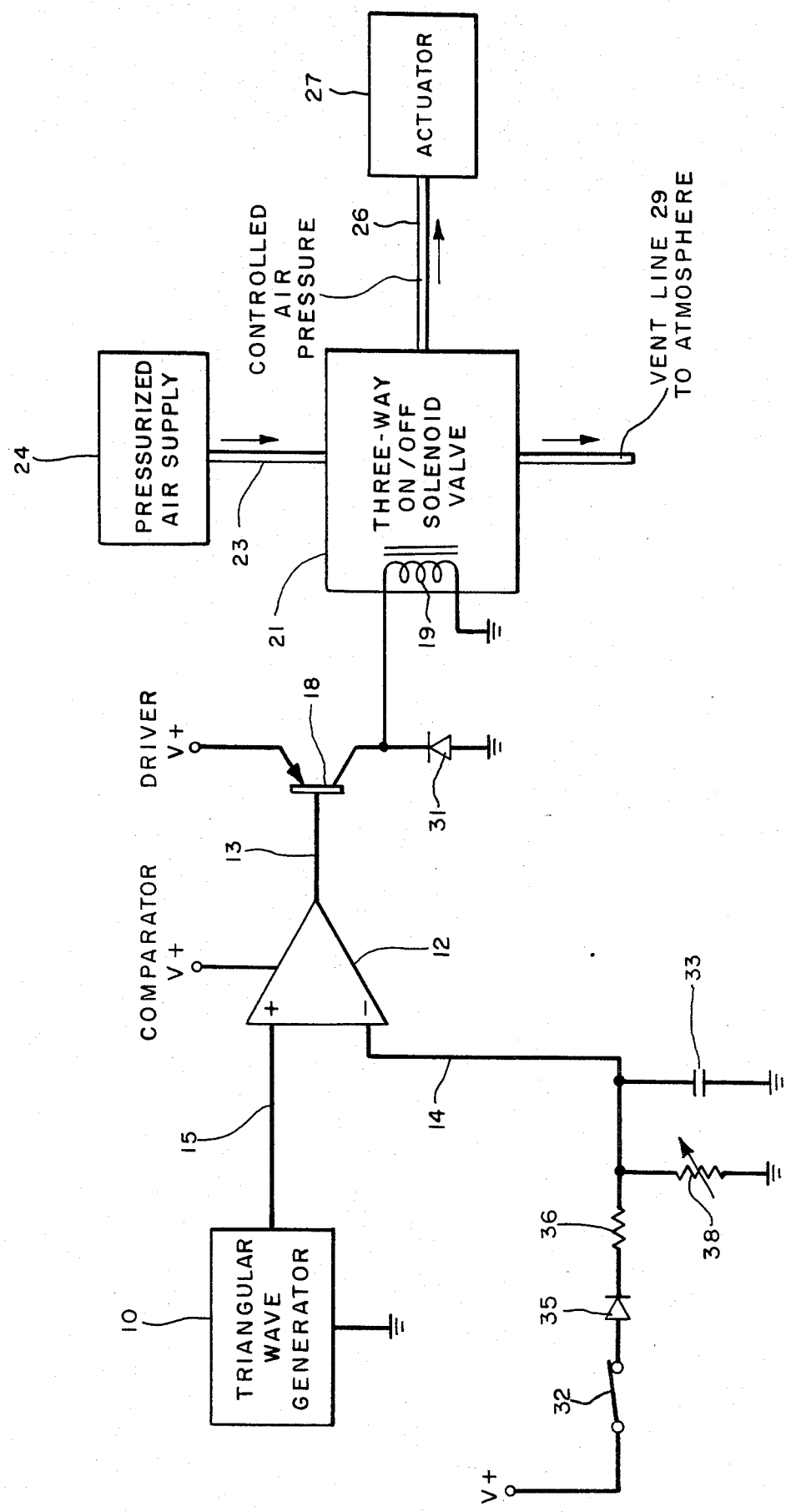

CONTROL SYSTEM FOR CONTROLLING THE ENGAGEMENT OF A PRESSURE-OPERATED ACTUATOR

BACKGROUND OF THE INVENTION

This invention relates to a control system for controlling the fluid pressure applied to a pressure-operated actuator, such as a clutch or a brake mechanism, to effect a smooth engagement of the actuator.

In many fluid pressure-operated actuators a gradual, rather than an abrupt, change in applied pressure is desired so that the actuator engages smoothly. A sharp pressure change causes an abrupt engagement which in turn produces high mechanical stresses in the actuator and possible component damage. Various valve arrangements have been developed in the past to apply gradually changing pressures to actuators, but these prior arrangements have reliability problems, require large spaces, are complex in construction, and are relatively expensive. The present invention overcomes all of these shortcomings and obtains smooth, optimum engagement of an actuator by providing, for the actuator, a control system which is of relatively simple and inexpensive construction, requires relatively little space, and is highly reliable in operation.

SUMMARY OF THE INVENTION

The invention provides a control system for controlling the fluid pressure applied to a pressure-operated actuator, such as a brake or clutch, to optimize the rate of engagement thereof. The control system comprises a pulse width modulation circuit for developing a pulse width modulated signal. Control means are provided for controlling the pulse width modulation circuit to gradually change the duty cycle of the pulse width modulated signal in a constant direction. Means, such as a three-way on/off solenoid valve which receives pressurized fluid, responds to the pulse width modulated signal for producing a gradually increasing fluid pressure. Finally, the control system includes means for applying the gradually increasing fluid pressure to the actuator to effect a smooth engagement of the actuator.

DESCRIPTION OF THE DRAWING

The features of the invention which are believed to be novel are set forth with particularity in the appended claims. The invention may best be understood, however, by reference to the following description in conjunction with the accompanying drawing which schematically illustrates a control system, constructed in accordance with the invention, for regulating the engagement rate of a pressure-operated actuator.

DESCRIPTION OF THE ILLUSTRATED EMBODIMENT

Referring to the drawing, triangular wave generator 10 and comparator 12 provide a pulse width modulation circuit for producing, on line 13, a signal of either constant amplitude or a signal having a pulse width modulated wave-shape, as determined by the amplitude of the signal on line 14 relative to the signal amplitude on line 15. As is well understood, a pulse width modulated signal is rectangular shaped, containing periodically recurring positive-going pulse components with intervening negative-going pulse components. The frequency and period will be constant but the relative widths (connoting time durations) of the positive and negative pulse components will vary depending on the amplitude of the signal on line 14, assuming that that amplitude level lies somewhere within the amplitude range over which the triangular shaped signal on line 15 varies. As the width or duration of each positive pulse component increases, each negative pulse component decreases proportionally, and vice versa. In other words, since the period or time duration of a complete cycle is constant, when the duration of a positive pulse component changes in one sense or direction, the width of the immediately succeeding negative pulse component must change in the opposite sense. The pulse width modulated signal has a duty cycle characteristic which is the ratio of width of each positive-going pulse compared to the duration of a complete cycle.

Preferably, the frequency of the triangular shaped signal produced by generator 10 is around 10 hertz. In order to develop a pulse width modulated signal at the output of comparator 12, the voltage at the positive or non-inverting input of the comparator must vary alternately above and below the voltage level of the signal at the comparator's negative or inverting input. Each time the alternating voltage at the positive input becomes greater than (namely positive relative to) the voltage at the negative input, the output voltage of comparator 12 abruptly switches from ground or zero volts to V+, which may be +12 volts d-c if the actuator and its control system are included in an automotive vehicle, where it remains until the triangular shaped voltage signal drops below (namely becomes negative with respect to) the voltage signal at the negative input. At that instant, the output voltage of the comparator switches from its high level (V+) back to its low level or zero. The smaller the amplitude of the signal at the negative input, the greater the time intervals during which the output of comparator 12 is established at its high potential level and the smaller the time intervals when the output is at zero potential, namely the greater the duty cycle. Hence, the duty cycle of the pulse width modulated signal on line 13 is inversely proportional to the signal on line 14.

Of course, if the amplitude level on line 14 is less than (or negative relative to) the amplitude range over which the triangular shaped signal varies, the comparator's output will be maintained at its high (V+) level. In effect, the pulse width modulated signal would have a 100% duty cycle. On the other hand, if the amplitude of the signal on line 14 is held at a level that is greater than (or positive compared to) the amplitude range of the triangular wave, the comparator's output will be held at its low or zero level. Under those signal conditions, the pulse width modulated signal on line 13 would effectively have a zero % duty cycle. An explanation of the operation of the control circuit connected to line 14 will be provided later. Suffice it to say at this point that comparator 12 is controlled to output either a high voltage (V+) or a low voltage (zero volts).

The output signal on line 13 operates the driver, comprising transistor 18, to control the energization of the solenoid coil 19 which is included in the three-way on/off solenoid valve 21. When the output voltage of comparator 12 is low, transistor 18 conducts to energize coil 19, whereas when the output of the comparator is established at its high level, transistor 18 will be turned off and coil 19 will be de-energized. Valve 21 is of conventional construction and operates in well-known manner. It is normally open so that when coil 19 is de-energized line 23, over which air pressure is delivered from pressurized air supply 24 (which may be an air compressor) to the inlet port of the valve, is connected to line 26 to supply the full air pressure to actuator 27, which can be a clutch or brake mechanism, or any unit which responds to a change in fluid pressure. In the normally open position of valve 21, the exhaust orifice, which connects via vent line 29 to the atmosphere, is closed or sealed off. Energization of coil 19 shifts valve 21 to its closed position wherein the inlet port (line 23) is closed off and outlet line 26 connects to the exhaust port (vent line 29). In this closed position, the fluid (if any) in line 26 will be exhausted and atmospheric pressure will be applied to actuator 27.

If a pulse width modulated signal is applied to the base of transistor 18, coil 19 will be alternately energized and de-energized to rapidly switch the valve 21 between pressure in and exhaust out, in accordance with the signal's duty cycle, to create a controlled fluid pressure, between these extremes, for application to actuator 27. The smaller the duty cycle, the longer the energization of coil 19 during each cycle of the pulse width modulated signal, and the less the fluid (air) pressure applied to actuator 27. Hence, by increasing the duty cycle of the pulse width modulated signal on line 13, the energization time of coil 19 may be lessened, causing the fluid pressure in line 26 to be increased. Diode 31 protects transistor 18 against inductive voltage spikes generated by coil 19 turning off.

Of course, while air pressure is employed in the illustrated embodiment to control the actuator 27, any pressurized fluid will suffice. For example, oil pressure may be used. Turning valve 21 on and off will still regulate the output pressure in line 26 at, or between, the pressure levels in lines 23 and 29.

Attention will now be given to the control circuit connected to line 14 and to the negative input of comparator 12, which control circuit controls the pulse width modulation circuit to regulate the duty cycle of the signal on line 13. As indicated in the drawing, switch 32 is normally closed. When it closes, capacitor 33 charges through diode 35 and resistance 36 toward voltage V+. The resistance 36 is relatively small so the capacitor charges rapidly to a level close to the voltage V+, which may be +12 volts as mentioned previously. At this time, the voltage across capacitor 33 (and thus the control signal on line 14) will be greater than the highest voltage of the triangular shaped signal on line 15. This constant-amplitude control signal establishes and maintains the output voltage of comparator 12 at its low or zero level. The signal on line 13 will therefore have a zero % duty cycle, causing transistor 18 to conduct which in turn energizes solenoid coil 19. With the coil on, line 26 will be connected to the exhaust port and vent line 29, the inlet port and line 23 being sealed off. As a result, a zero fluid (or atmospheric air) pressure will be applied to the pressure-operated actuator 27 and the actuator will be disengaged. In short, by closing switch 32 actuator 27 is quickly disengaged. Of course, switch 32 can take a variety of differing forms. It may be a simple manually-operated off-on switch, a relay-operated switch, a solid state switch, a switch which is actuated in response to some sensed parameter, such as pressure, temperature, vehicle speed, etc. Switch 32 may constitute any switching means capable of controlling the control circuit connected to line 14.

In accordance with the invention, shifting of actuator 27 from its disengaged position to its engaged position is made very smoothly, and not abruptly, by controlling the air pressure in line 26 so that it increases gradually at an optimum rate from atmospheric pressure to a level which causes full engagement of the actuator. The desired relatively slow rate of engagement is achieved by the discharge time constant of capacitor 33. To explain, to initiate a smooth engagement of actuator 27, switch 32 is opened and this causes capacitor 33 to discharge through resistance 38 to ground or zero volts. Resistance 38 is much higher than resistance 36, as a consequence of which capacitor 33 discharges relatively slowly to create a slowly decaying voltage on line 14. For example, capacitor 33 may have a value of 10 microfarads and resistors 36 and 38 may have values of 1K and 1M, respectively.

The control signal applied to the negative input of comparator 12 thus gradually changes in a constant direction (specifically it gradially decreases) as capacitor 33 slowly discharges. When that control voltage drops into the amplitude range over which the triangular wave at the positive input varies, comparator 12 will begin to switch rapidly between its two conditions, to produce a pulse width modulated signal on line 13, as the triangular wave varies above and below the control voltage on line 14. At first the duty cycle will be very low, since the output voltage of the comparator will be at its high level for only a very small portion of each cycle. However, as capacitor 33 continues to discharge through resistance 38 the control voltage on line 14 continues to gradually decrease through the amplitude range of the triangular wave, as a consequence of which the duty cycle of the pulse width modulated signal gradually increases.

At the beginning of the pulse width modulated signal, when the duty cycle is low, solenoid coil 19 will be de-energized for only extremely short intervals to produce a low fluid pressure in line 26. As the duty cycle gradually increases, coil 19 will be energized for smaller and smaller intervals, as a result of which the fluid pressure gradually increases and causes the actuator 27 to engage smoothly. Of course, the rate of engagement of the actuator may easily be adjusted by changing the discharge time constant of capacitor 33. For this reason, resistance 38 is illustrated as being variable. In many applications, there will be an optimum engagement rate to provide a smooth transition. Not too fast which would provide a jerky engagement and possible component damage, and yet not too slow which would impose undue wear on friction elements in the actuator. This is particularly important when the invention is employed in an automatic transmission to achieve optimum shift quality.

While the illustrated control system automatically cycles the air pressure slowly up upon actuation of switch 32, obviously the control system could be modified to gradually decrease the air pressure in response to the switch actuation.

While particular embodiments of the invention have been described, modifications may be made, and it is intended in the appended claims to cover all such modifications as may fall within the true spirit and scope of the invention.

I claim:

1. A control system for controlling the rate of engagement of a pressure-operated actuator, comprising:
    means for developing a pulse width modulated signal having a duty cycle which gradually changes in a constant direction;

means responsive to said pulse width modulated signal for producing a gradually increasing fluid pressure;

and means for applying the gradually increasing fluid pressure to the actuator to effect a smooth engagement thereof.

2. A control system for controlling the fluid pressure applied to a pressure-operated actuator to optimize the rate of engagement of the actuator, comprising:

a pulse width modulation circuit for developing a pulse width modulated signal;

control means for controlling said pulse width modulation circuit to gradually change the duty cycle of the pulse width modulated signal in a constant direction;

means responsive to said pulse width modulated signal for producing a gradually increasing fluid pressure;

and means for applying the gradually increasing fluid pressure to the actuator to effect a smooth engagement of the actuator.

3. A control system according to claim 2 wherein the fluid pressure is air pressure.

4. A control system according to claim 2 wherein the actuator is a clutch.

5. A control system according to claim 2 wherein the gradually increasing fluid pressure is produced by supplying pressurized fluid to a three-way on/off solenoid valve which is rapidly switched between pressure in and exhaust out in response to the pulse width modulated signal, the fluid pressure applied to the actuator being proportional to the signal's duty cycle.

6. A control system according to claim 2 and including means for changing the rate at which the duty cycle changes in order to vary the engagement rate of the actuator.

7. A control system according to claim 2 wherein said pulse width modulation circuit includes a triangular wave generator, for producing a triangular shaped signal, and a comparator, the triangular shaped signal along with a gradually changing control signal, developed by said control means, being applied to said comparator to produce said pulse width modulated signal at the comparator's output.

8. A control system according to claim 7 and including means for establishing said control signal at a fixed amplitude level, which causes the comparator's output to be held at a constant amplitude level, in order to provide a zero fluid pressure to establish and to maintain disengagement of the actuator.

9. A control system according to claim 7 wherein said control means includes a capacitor; means for charging the capacitor relatively rapidly to apply a constant-amplitude control signal to the comparator, which results in a fixed amplitude level at the comparator's output and a zero fluid pressure; and means for discharging the capacitor relatively slowly to apply a gradually decreasing control signal to the comparator to gradually increase the duty cycle of the pulse width modulated signal and gradually increase the fluid pressure.

10. A control system according to claim 9 and including means for varying the rate at which the capacitor discharges in order to change the rate of engagement of the actuator.

11. A control system according to claim 7 wherein said control means includes a resistance-capacitance circuit, the capacitance discharging relatively slowly through the resistance to produce the gradually changing control signal.

12. A control system according to claim 11 wherein said capacitance is held in a charged condition to maintain a fixed amplitude control signal which results in a fixed amplitude level at the comparator's output and a zero fluid pressure.

* * * * *